US008315834B2

(12) United States Patent
Gimelfarb et al.

(10) Patent No.: US 8,315,834 B2
(45) Date of Patent: Nov. 20, 2012

(54) SYSTEM AND METHOD FOR MEASURING COATING THICKNESS

(75) Inventors: Vladimir Gimelfarb, Oviedo, FL (US); Kent Hultgren, Winter Park, FL (US)

(73) Assignee: Siemens Energy, Inc., Orlando, FL (US)

( * ) Notice: Subject to any disclaimer, the term of this patent is extended or adjusted under 35 U.S.C. 154(b) by 1095 days.

(21) Appl. No.: 10/738,882

(22) Filed: Dec. 17, 2003

(65) Prior Publication Data

US 2005/0137829 A1    Jun. 23, 2005

(51) Int. Cl.
G01B 5/02    (2006.01)
(52) U.S. Cl. ........................................................ 702/171
(58) Field of Classification Search .................. 702/155, 702/170–172; 427/8–10; 118/688–691; 356/630, 3.13
See application file for complete search history.

(56) References Cited

U.S. PATENT DOCUMENTS

| | | | |
|---|---|---|---|
| 4,334,495 A * | 6/1982 | Derkacs et al. ............... | 118/669 |
| 4,549,079 A * | 10/1985 | Terasaka et al. ......... | 250/339.11 |
| 4,634,291 A | 1/1987 | Bantel et al. | |
| 4,826,321 A * | 5/1989 | Coates et al. ................. | 356/492 |
| 4,897,536 A * | 1/1990 | Miyoshi ..................... | 250/201.6 |
| 4,908,508 A | 3/1990 | Dubbeldam | |
| 4,977,853 A | 12/1990 | Falcoff et al. | |
| 5,212,738 A | 5/1993 | Chande et al. | |
| 5,258,824 A * | 11/1993 | Carlson et al. ................. | 356/632 |
| 5,296,288 A | 3/1994 | Kourtides et al. | |
| 5,355,083 A | 10/1994 | George et al. | |
| 5,564,830 A * | 10/1996 | Bobel et al. ..................... | 374/126 |
| 5,731,030 A * | 3/1998 | Friese et al. ...................... | 427/8 |
| 5,757,498 A * | 5/1998 | Klein et al. .................... | 356/630 |
| 5,871,805 A | 2/1999 | Lemelson | |
| 5,940,175 A * | 8/1999 | Sun ............................. | 356/237.3 |
| 5,986,277 A * | 11/1999 | Bourque et al. .............. | 250/554 |
| 6,007,880 A | 12/1999 | Maloney | |
| 6,052,191 A | 4/2000 | Brayden, Jr. et al. | |
| 6,120,833 A | 9/2000 | Bonnebat et al. | |
| 6,162,488 A | 12/2000 | Gevelber et al. | |
| 6,187,453 B1 | 2/2001 | Maloney | |
| 6,197,424 B1 | 3/2001 | Morrison et al. | |

(Continued)

FOREIGN PATENT DOCUMENTS

EP    0452665 A2    10/1991

(Continued)

OTHER PUBLICATIONS

Websters New World Dictionary, Third College Edition, 1988, p. 396.*

(Continued)

Primary Examiner — Stephen Cherry

(57) ABSTRACT

Embodiments of the invention relate to a system and a method for measuring the thickness of a coating applied to a substrate or component. Embodiments of the invention relate to measuring the distance between a surface of a component, both before and after the surface is covered with a coating material, and an optical measuring device such as a laser displacement sensor. In addition, aspects of the invention include the measurement of the temperature of the component surface before and after the application of the coating and after the component has cooled to substantially ambient temperature. In such case, a more accurate coating thickness calculation can be made by accounting for the thermal expansion of the component due to the deposition of a heated coating on the component surface. Accordingly, embodiments of the invention are particularly suited for thermal spray processes.

21 Claims, 4 Drawing Sheets

U.S. PATENT DOCUMENTS

| | | | |
|---|---|---|---|
| 6,459,951 B1 | 10/2002 | Griffith et al. | |
| 6,461,456 B1 | 10/2002 | Kurokawa et al. | |
| 6,478,875 B1 * | 11/2002 | Sampath et al. | 118/712 |
| 6,484,121 B1 | 11/2002 | Filev et al. | |
| 6,537,605 B1 * | 3/2003 | Kirchner et al. | 427/8 |
| 6,776,845 B2 * | 8/2004 | Minami et al. | 118/665 |
| 2002/0192847 A1 | 12/2002 | Ino et al. | |
| 2003/0143318 A1 | 7/2003 | Schutte | |

FOREIGN PATENT DOCUMENTS

| | | |
|---|---|---|
| JP | 61126409 A2 | 6/1986 |
| JP | 6339647 A2 | 12/1994 |
| JP | 7236841 A2 | 9/1995 |
| JP | 11276989 A2 | 10/1999 |
| WO | WO 95/05246 | 2/1995 |
| WO | WO 01/84074 A1 | 11/2001 |

OTHER PUBLICATIONS

Keyence, Sensors Vision & Measurement, Catalog 2002-2003, 2001, p. 416-418,Keyence Coporation, Japan.

Keyence, CCD Laser Displ. Sensor LK Series, Appln Handbook, 1998, p. LK-AP-014, 016, 026, 028, USA.

Keyence, CCD Laser Displ. Sensor, LK Series, Instruction Manual, 1997, Manual, Keyence Corp, Japan.

* cited by examiner

SYSTEM AND METHOD FOR MEASURING COATING THICKNESS

FIELD OF THE INVENTION

The invention relates in general to surface coatings, and, more particularly, to a system and method for measuring the thickness of a coating, especially a coating applied by a thermal spray process.

BACKGROUND OF THE INVENTION

In a variety of applications, a coating can be applied to one or more surfaces of a component. The coatings can be made from any of a number of materials and can improve at least some of the surface properties of the component. In any coating process, it is usually important to achieve the design coating thickness. Too thin of a coating may not provide adequate protection; conversely, too thick of a coating may result in adherence problems between the coating itself and the underlying substrate due at least in part to a thermal expansion mismatch between the coating and the substrate.

Accordingly, a number of techniques have been developed for measuring the thickness of a coating applied to a component. For example, micrometers can be used to measure the distance between two points of contact between the micrometer and a component's surface. Another known method involves measuring variations in magnetic field or in impedance of Eddy current inducting coils caused by coating thickness variations. These methods can work in certain instances, but they lack the versatility to maintain their accuracy in connection with certain coatings processes and/or components with complex geometries such as fillets on a turbine engine blade or vane.

For instance, the accuracy of these and other known methods is dependent on the surface temperature of the component. As a result, these methods cannot be used until the component has cooled to ambient temperature or else the accuracy of the measurements is sacrificed. This delay may ultimately be counterproductive in manufacturing processes in which the coating is applied by thermal spray processes (e.g., high velocity oxygen fuel (HVOF), plasma, or arc spray) where the component is subjected to a large heat input. In such case, the component must cool to substantially ambient temperature so that an accurate thickness measurement can be made, but, if it is discovered that the coating thickness is below the design limits, then additional coating material must be added. However, extra coating material cannot simply be applied on top of the cooled coating material without diminishing the effectiveness of the coating's properties. Thus, the coating should be totally stripped and reapplied, which increases manufacturing cost and cycle time. Many of the prior systems do not allow for measurement of the coating thickness substantially simultaneously with the application of the coating itself.

Other factors that can affect the accuracy of measurement are surface curvature and the location of measurement relative to edges, holes or grooves. The difficulties associated with surface curvature can be solved by manufacturing special probes, which can significantly increase manufacturing costs. Thus, there is a need for a system that allows for the measurement of coating thickness substantially simultaneously with and/or immediately after completion of the coating process. Further, there is a need for a system in which the accuracy of measurement is not affected by component shape or surface temperature.

SUMMARY OF THE INVENTION

Aspects of the invention are directed to a method for measuring the thickness of a coating on a component. In accordance with the method, a component is provided having at least one surface. Next, one or more surface distances are measured between an optical measurement device and at least one surface target point on the at least one surface. A coating is applied on at least a portion of the at least one surface of the component, the portion including the at least one surface target point. One or more coating distances is measured between the optical measurement device and at least one coating target point. This step can be the conducted substantially simultaneously with or immediately after the coating application step. The at least one coating target point is substantially superimposed over the at least one surface target point. The at least one surface target point and the at least one coating target point can be one of a plurality of discrete points or a substantially continuous path.

Finally, the difference between the surface and coating distance measurements is calculated so as to determine the thickness of the coating at the at least one target point. Based on the coating thickness calculations, the areas where additional coating is required can be determined, and additional coating can be applied to areas of the at least a portion of the at least one surface.

One or more surface temperatures can be measured at the at least one surface target point. Each of the surface temperature measurements can be taken at substantially the same point as each of the surface distance measurements. Substantially concurrently or substantially immediately after the step of applying the coating, one or more coating temperatures can be measured at the at least one coating target point. Each of the coating temperature measurements can be taken at substantially the same point as each of the coating distance measurements. The step of applying the coating can include at least two coating cycles or passes; in such case, the step of measuring the surface distance can be conducted after each coating cycle. Further, the rate at which the coating is deposited during each cycle can be calculated at each coating target point.

The component and/or coating can be allowed to reach or cool to substantially ambient temperature. Then, one or more ambient coating distances can be measured between the optical measurement device and the at least one coating target point. In addition, one or more ambient coating temperatures can be measured at the at least one coating target point. Each of the ambient coating temperature measurements can be taken at substantially the same point as each of the coating distance measurements. Thus, a thermal expansion correlation value can be calculated for each target point. In turn, the thickness of the coating for each target point can be calculated by taking into account the thermal expansion correlation value.

Each surface temperature measurement can be taken substantially simultaneously with each corresponding surface distance measurement. Each distance measurement can be an average of at least two measurements taken at different locations substantially proximate to each target point.

In another respect, aspects of the invention relate to a system for measuring the thickness of a coating on a component. The system includes a coating imparting device attached to a movable control arm; an optical measurement device; a data acquisition system; and a programmable controller. In one embodiment, the coating imparting device can be a thermal spray gun.

The optical measurement device, which can be one of a CCD laser displacement sensor or a wide beam CCD laser displacement sensor, measures the distance between the optical measurement device and the at least one component surface along a target profile. The optical measurement device is also attached to the control arm. The controller is operatively associated with the control arm, such that it can move the control arm, and at least one of the data acquisition system and optical measurement device. The optical measurement device can be positioned relative to the coating imparting device such that one or more distance measurements can be taken either substantially simultaneously with the application of a coating to the at least one surface of the component or substantially immediately after a coating is applied to the at least one surface of the component. In one embodiment, the optical measurement device can be positioned substantially perpendicular to the component surface at each measurement location or target point.

The data acquisition system stores data received from at least one of the optical measurement device and the movable control arm. The data acquisition system is programmed to calculate coating thickness based at least on distance measurements taken along the target profile before and after a coating is applied to the at least one surface.

The system can further include a temperature measurement device, such as a pyrometer, for measuring the temperature at each distance measurement taken at each target point. The temperature measurement device can be operatively associated with the data acquisition system. In addition, the temperature measurement device can be attached to the control arm. The data acquisition system can further programmed to take into account thermal expansion in calculating coating thickness based at least on the temperature measurements taken at the target points before and after a coating is applied to the at least one surface. The temperature measurement device and optical measurement device can be aligned so that the temperature measurement is made in substantially the same location as the distance measurement.

DETAILED DESCRIPTION OF EMBODIMENTS OF THE INVENTION

Embodiments of the invention address the limitations associated with prior coating measurement systems and/or methods. Aspects of embodiments of the present invention relate to a system for measuring the thickness of a coating on a component without suffering a decline in measurement accuracy due to component geometry or surface temperature. Other aspects of the invention are directed to a related method for measuring coating thickness.

Embodiments of the invention are shown in FIGS. 1-3B, but the present invention is not limited to the illustrated structure or application. Further, the following detailed description is intended only as exemplary.

Figure 1:
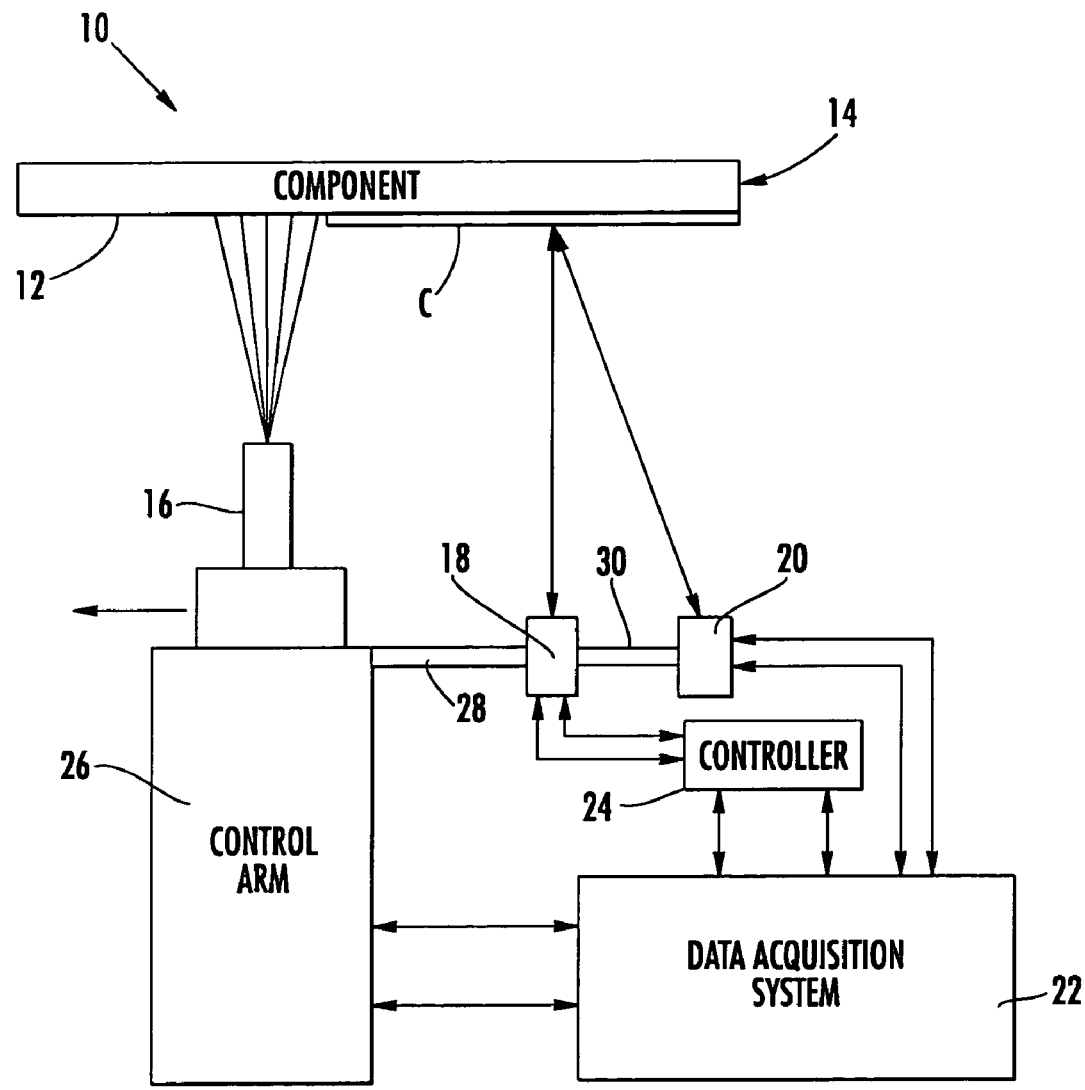
FIG. 1 is a diagrammatic view of an embodiment of a coating measurement system according to the invention.

FIG. 1 shows an embodiment of a coating measurement system 10 according to aspects of the invention. The system 10 can include several devices that cooperate to measure the thickness of a coating C applied to the surface 12 of a component or substrate 14. The coating material C can be any of a variety of coating materials such as paints, metals, plastics, ceramics and combinations thereof. In some systems, the coating C can comprise two or more layers. In a multi-layer coating, the composition of the coating material and the process used to deposit the material in one layer can be substantially identical or substantially different compared to that of another layer. For instance, a base layer can comprise MCrAlY, which is a base metal (e.g. nickel, cobalt or iron) that can contain chromium, aluminum and yttrium as alloying elements. Another layer can be applied on top of the MCrAlY layer; this second layer can be another metal alloy layer or it can be a completely different substance such as a ceramic like zirconium oxide. This dual layer embodiment is merely provided as an example as aspects of the invention are not intended to be limited to any particular coating material or coating arrangement.

The system 10 can include a device 16 such as a spray gun for imparting a coating material C onto a substrate 14. The coating C can be imparted onto one or more surfaces 12 of a component 14 in a variety of processes. For example, the coating C can be applied by way of an aerosol spray, physical vapor deposition, chemical vapor deposition or different thermal spray processes. Aspects of the invention are especially suited for coatings that are applied by a thermal spray process such as HVOF, plasma or arc spray, to name a few. In a thermal spray process, a device such as a thermal spray gun can be provided to deposit the coating C onto the component surface 12. Once again, aspects of the invention are not limited to any particular manner of imparting the coating C; thus, other processes and other coating deposition devices known to those skilled in the art can be used in accordance with embodiments of the invention.

Another component of a system according to aspects of the invention is an optical measuring device 18. The optical measuring device 18 can be any device that can measure the distance between the device 18 and the surface 12 of the component 14 without directly contacting the component 14. Direct contact does not include impingement on a surface by a laser or other beam of light. In one embodiment, the optical measuring device 18 can be a CCD laser displacement sensor, which is known in the art. For example, the optical measuring device can be a Keyence CCD laser displacement sensor Model No. LK-031.

Figure 2A:
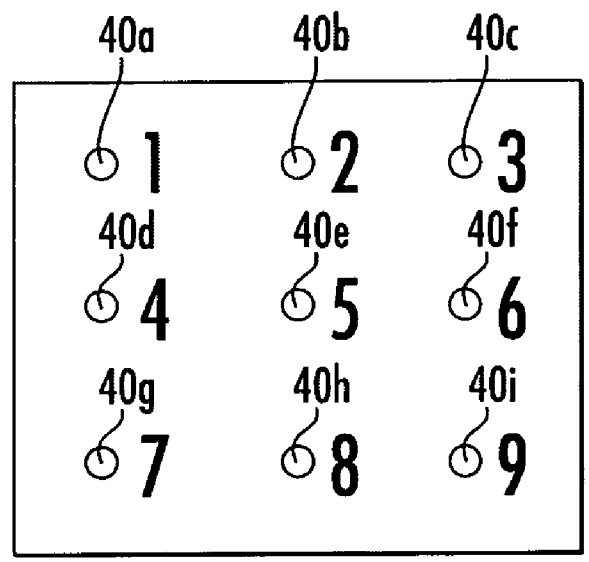
FIG. 2A is a plan view of a component showing a plurality of discrete target measurement points according to aspects of the invention.
Figure 2B:
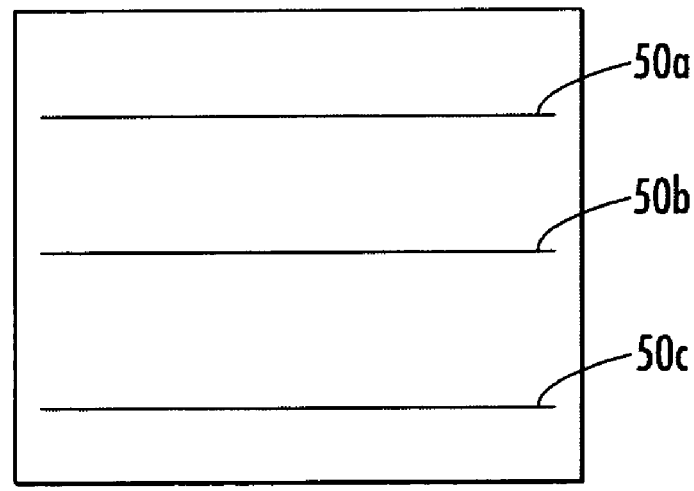
FIG. 2B is a plan view of a component showing a plurality of target measurement profiles according to aspects of the invention.
Figure 3A:
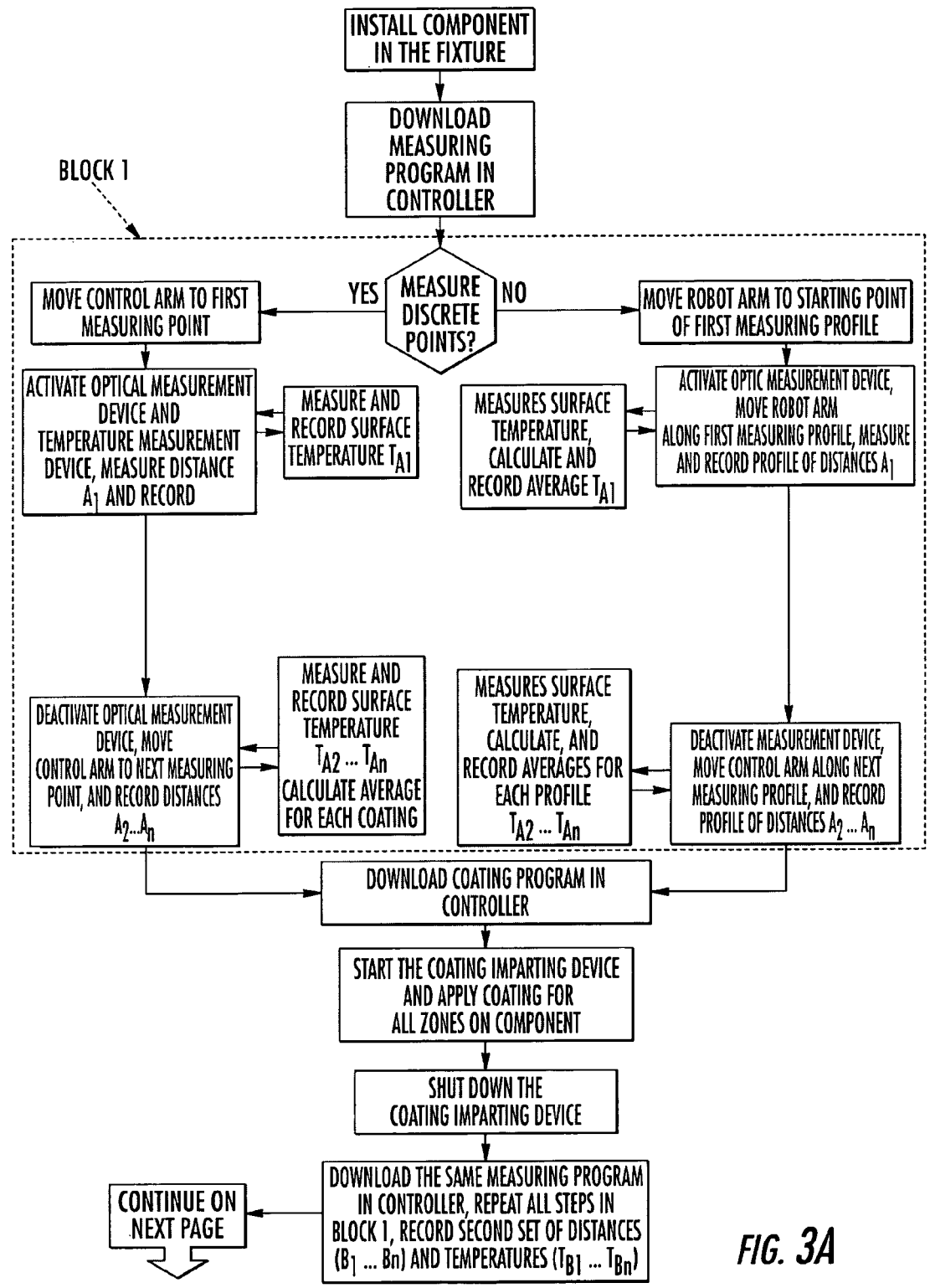
FIG. 3A is a flow chart of one method for measuring a coating according to embodiments of the invention.
Figure 3B:
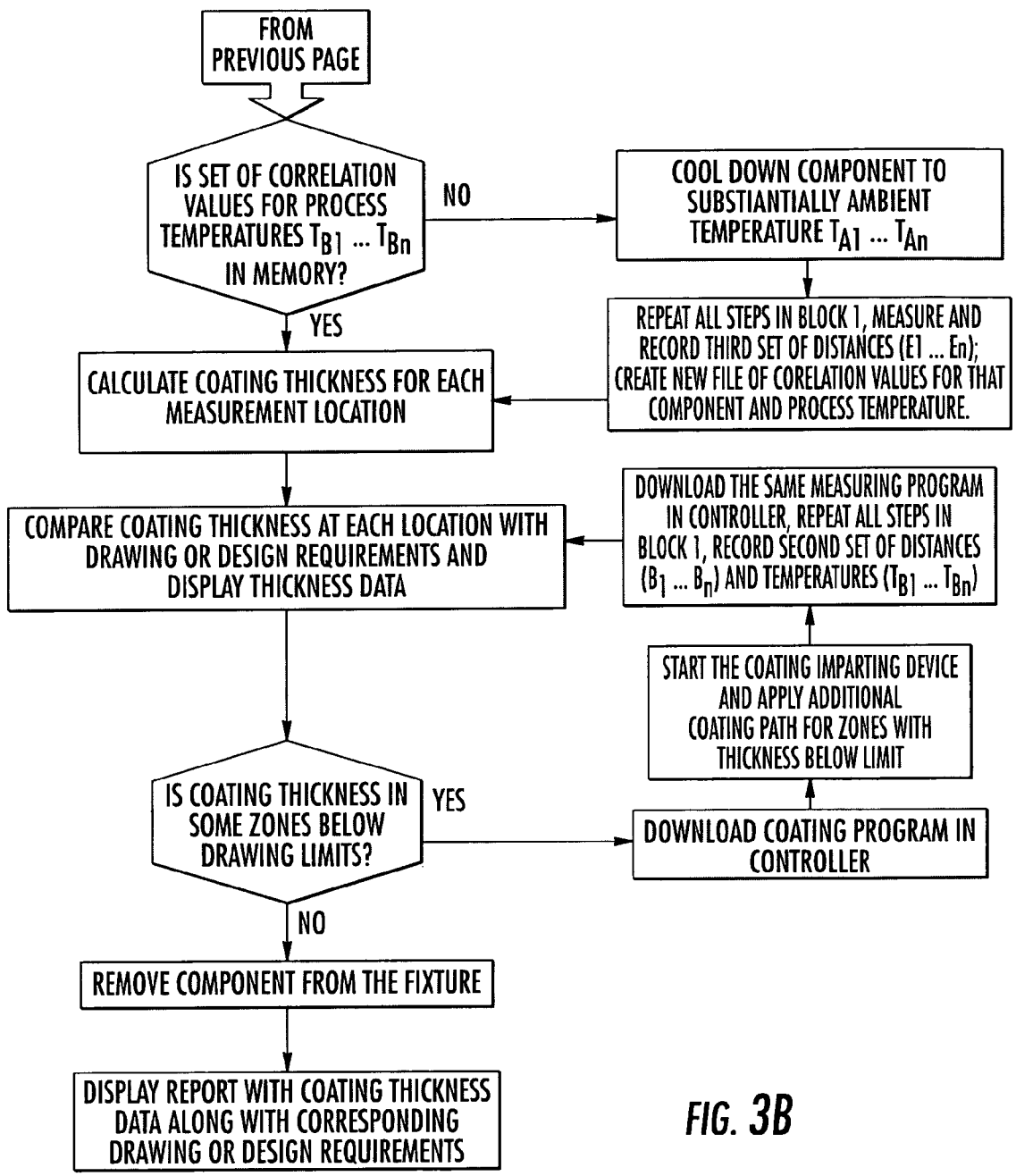
FIG. 3B is a continuation of the flow chart of FIG. 3A showing one method for measuring a coating according to embodiments of the invention.

For any given location, the optical measuring device 18 can take a single measurement. Alternatively, the device 18 can take a plurality of measurements and determine the average distance. In such case, the optical measuring device 18 is preferably a wide beam CCD laser displacement sensor. Some wide beam CCD laser displacement sensors can average a plurality of readings taken within a point area that is about 700 microns by about 30 microns. In contrast, a regular beam CCD laser displacement sensor can take a reading on a point, area or spot that is from about 30 microns to about 70 microns in diameter. The optical measurement device 18 can take readings at one or more target points, which can be discrete points 40a, 40b, 40c, 40d, 40e, 40f, 40g, 40h, 40i (FIG. 2A) according to a pattern or to no pattern at all, or the one or more target points can be substantially continuous points along one or more predefined paths 50a, 50b, 50c (FIG. 2B). The measurements taken by the optical measurement device 18 can be output as a signal such as an analog signal.

The system 10 can further include a temperature measurement device 20 such as one that does not require direct contact with the surface 12 of the component 14 or the coating C in order to measure the temperature. The temperature measurement device 20 can be a pyrometer. Like the optical measurement device 18, it is preferred if the temperature measurement device 20 does not directly contact the surface being measured. Preferably, the temperature measurement device 20 can convert any temperature measurement into an output signal.

The system 10 according to embodiments of the invention can further comprise an electronic data acquisition system 22. The data acquisition system 22 can be provided with memory that can receive and store any data or signals received from the optical measurement device 18 and/or the movable control arm 26. The electronic data acquisition system 22 can, either substantially continuously or periodically, monitor, display and/or record any information received. The data acquisition system 22 can provide dedicated locations for data received from specific measurement points. Moreover, the data acquisition system 22 can be programmed to calculate coating thickness based at least on distance measurements taken along one or more target points before and after a coating C is applied to the at least one surface 12 of a component 14. In such case, the electronic data acquisition system 22 can calculate coating thickness based on the following formula:

$$T_n = A_n - B_n$$

In the above formula, $T_n$ is the coating thickness at location "n"; $A_n$ is the distance between the optical measurement sensor and the component surface measured at location "n" before the application of a coating at ambient temperature; and $B_n$ is the distance between the optical measurement sensor and the component surface measured at location "n" substantially immediately after the completion of the coating application. While providing accurate measurements for some coating applications, this formula may not necessarily give an accurate reading in all coating applications. For example, in thermal spray processes where the component 14 can experience a thermal input, which can increase temperature of the component 14 to about 500° F., the formula fails to take into account thermal expansion of the component 14 and/or coating C. Accordingly, in at least some instances, the electronic data collection system 22 can be programmed to compute a correlation value for thermal expansion for any given location. The correlation value can determined according to the following formula:

$$E_n = |D_n - B_n|,$$

where $E_n$ is the correlation value for thermal expansion at location "n"; $D_n$ is the distance between the optical measurement device and the component surface measured at location "n" after completion of the coating application and the component is allowed to cool to substantially ambient temperature; and, again, $B_n$ is the distance between the optical measurement sensor and the component surface measured at location "n" substantially immediately after the completion of the coating application. The data acquisition system 22 can calculate the correlation values for every measurement location and store them in memory. Thus, the correlation values can be used for thickness calculations at corresponding measurement locations for all similar components in subsequent coating applications, thereby eliminating the need to measure temperatures and compute thermal expansion correlation values for any part that is substantially identical and is coating with substantially the same material. With such information, the system can compute a more accurate coating thickness using the following formula:

$$T_n = A_n - B_n - E_n$$

The thermal expansion correlation value should be determined separately for each layer of coating, which may be applied by a different coating process or be a different coating material altogether.

Some or all of the above components can be controlled by a control system that can include at least a controller 24 and a control arm 26. The controller 24 can be programmable and can be operatively associated with the control arm 26 and at least one of the data acquisition system 22, optical measurement device 18, and coating imparting device 16. The controller 24 can be a single controller for all devices in the system 10 according to the invention or it can be multiple controllers dedicated to a particular component or components. For example, when the Keyence CCD laser displacement sensor Model No. LK-031 is used, Keyence Controller Model No. LK-2001 can be dedicated to controlling the operation of the laser displacement sensor. The controller 24 can direct movement, orientation and operation of the control arm 26. There can be unidirectional or bidirectional communications between the controller 24 and any of the components of the system such as the coating imparting device 16, control arm 26, optical measurement device 18, temperature measurement device 20 and the data acquisition system 22.

The control arm 26 can be a robot control arm. It is preferred if the coating imparting device 16 and the optical measuring device 18 are connected to the robot control arm 26 in some manner in order to control the application of the coating and to take measurements. It is preferred if manual application of the coating and measurement of the distances and temperatures is avoided so as to avoid human error. In one embodiment, a thermal spray gun or other coating imparting device 16 can be mounted directly on the robot arm 26, as shown in FIG. 1. In addition, the optical measurement device 18 and the temperature measurement device 20 can be attached either directly or indirectly to the robot arm 26. For example, the optical measurement device 18 can be attached to the robot arm 26 by an attachment bracket 28; similarly, the temperature measurement device 20 can be attached to the optical measurement device 18 by another attachment bracket 30.

The system 10 can also include a fixture (not shown) for holding and/or supporting the component 14. The fixture can be almost any fixture and will depend on the component 14 being coated. The fixture can be associated with a CNC table or conveyor or it may simply rest atop a surface. The fixture can be moved so as to orient the component 14 as necessary to measure or coat the component 14.

The component or substrate 14 being coated can be any component and a system 10 according to aspects of the invention is not limited by the component geometry or contours. Further, the surfaces 12 of the component 14 can be smooth, rough or otherwise irregular. The component 14 can be relatively simple such as a flat plate or it can be a complicated component such as a turbine engine component like a blade or vane.

Having described an assortment of components and a manner in which the components can be arranged to form a coating measurement system in accordance with aspects of the present invention, one example of a method in which such a system 10 can be used to measure coating thickness will be described below. Of course, coating measurement methods according to aspects of the present invention are compatible with several coating measurement systems as one skilled in the art would appreciate and are not limited to the above-described measurement system. Further, the following description is merely an example of a sequence in which the individual steps can occur. The described steps, shown in the flow chart in FIGS. 3A-3B, can be performed in almost any order and not every step described must occur.

At the outset, a component 14 having at least one surface 12 is provided. The component 14 can be almost any component. Similarly, the component 14 can have any of a variety of geometries. For example, the component 14 can be a flat plate or it can be a turbine engine component such as a blade or a vane. Any necessary preparations including surface treatments can be performed on the component 14 in preparation for coating application. Next, the component 14 can be installed in the fixture (not shown).

If not already in place, a measuring program can be downloaded to the controller 24. The controller 24 can direct the control arm 26 to move the optical measurement device 18 to predefined target points to measure the distance between the optical measurement device 18 and at least one surface target point on the component surface 12. The optical measurement device 18 can be a laser displacement sensor. It should be noted that the at least one surface target point can be a single point or it can be a plurality of points. In one embodiment, the at least one surface target point can be a plurality of discrete points 40a, 40b, 40c, 40d, 40e, 40f, 40g, 40h, 40i (see FIG. 2A). In an alternative embodiment, the at least one surface target point can be a substantially continuous path made up of multiple points 50a, 50b, 50c (see FIG. 2B). The substantially continuous path can be substantially linear and/or substantially planar, but it does not have to be either. For example, the substantially continuous path may be include curves or may be circular, to name a few possibilities. The surface distance measurements can be stored in a data acquisition system 22. Each distance measurement can be a single measurement point or, preferably, an average of at least two measurements taken at different locations substantially at or proximate to each target point. Taking the average of multiple measurement points is especially desirable on parts having rough surface finishes.

In addition to measuring surface distances and prior to the step of applying the coating, one or more surface temperatures at the at least one surface target point can be measured. Each of the surface temperature measurements can be taken at substantially the same point and/or at substantially the same time as each of the surface distance measurements. The temperatures can be measured using a temperature measurement device 20 such as a pyrometer.

Once the desired measurements are taken, a coating C can be applied on at least a portion of the at least one surface 12 of the component 14. The portion includes the at least one surface target point. If it is not already in the controller 24, a coating program can be downloaded into the controller 24. The step of applying the coating C can be performed using a thermal spray process. Further, for each layer of coating C, the step of applying the coating can include at least two coating passes or it may be a single-pass operation. When ready, the program controller 24 will start up the coating imparting device 16 such as a thermal spray gun and the control arm 26 will begin movement with the spray gun along a predefined spray path until the required number of coating passes are completed. The step of applying the coating may or may not generally follow the same path for the preceding distance and temperature measurement steps.

When the coating application is completed, the controller 24 can deactivate the coating imparting device 16. One or more coating distances can be measured between the optical measurement device and at least one coating target point. The step of measuring the coating distance can be conducted substantially simultaneously with or immediately after the coating applying step. The at least one coating target point can be substantially superimposed over the at least one surface target point. Further, one or more coating temperatures can be measured at the at least one coating target point, wherein each of the coating temperature measurements is taken at substantially the same point as each of the coating distance measurements. The same controller program used to record the pre-coating temperature and/or distance measurements can be used to record these post-coating temperature and/or distance measurements, which can be recorded in memory of the data acquisition system 22 allocated for each particular measurement location.

The difference between the surface and coating distance measurements can be computed, as described earlier, so as to determine the thickness of the coating C at each target point. For greater accuracy, the component and/or coating can be allowed to cool to substantially ambient temperature. During this time, it is preferred if the component is retained in the fixture. When substantially ambient temperature is reached, one or more ambient coating distances between the optical measurement device and the at least one coating target point can be measured. Similarly, one or more ambient coating temperatures can be measured at the at least one coating target point. Each of the ambient coating temperature measurements can be taken at substantially the same point as and substantially simultaneously with each of the ambient coating distance measurements.

With the ambient coating temperatures and the coating temperatures, the electronic data acquisition system 22 or other device can compute a thermal expansion correlation value for each target point as discussed above. Then, the coating thickness can be calculated for each target point, taking into account the thermal expansion correlation value.

In the above method, it is preferred, at least for time saving reasons, that the surface temperature measurement is taken substantially simultaneously with each corresponding surface distance measurement.

When the step of applying the coating includes at least two coating layers, especially those applied with different coating processes or coating materials, the step or steps of measuring the surface distance can be conducted after each coating layer. Thus, there can be thickness calculations for each coating layer.

Further, in cases where multiple coating cycles or passes are required to create the layer, the step or steps of measuring the surface distance can be conducted substantially immediately after or substantially concurrently with each pass. In this regard, the data acquisition system 22 can calculate the coating deposition rate. Such information can be processed by the controller to adjust the deposition rate for subsequent coating cycles or deactivate the coating imparting device 16 and the coating program if the coating thickness will exceed the design range or tolerances. That is, if the expected coating thickness for the next cycle will exceed the design thickness at any target point, the spray rate can be adjusted for the next spray pass, or the next spray pass, in whole or in part, can be eliminated.

Based on the coating thickness calculations, those areas on the surface on the component 14 can be identified where additional coating C is required according to design specifications. Additional coating material C can be applied to those specific areas of the component surface 12.

Once the desired coating thickness is achieved, the component 14 can be removed from the fixture. The data acquisition system 22 can display or print a report with the data, calculations, and drawing or design requirements. It should be noted that throughout the entire process described above, the component 14 can remain in the same fixture. Leaving the component 14 in the fixture is desirable to reduce potential variations that may be introduced by setting and resetting the component in the fixture and to reduce the overall process time.

It will of course be understood that the invention is not limited to the specific details described herein, which are given by way of example only, and that various modifications and alterations are possible within the scope of the invention as defined in the following claims.

What is claimed is:

1. A method for measuring the thickness of a coating on a component comprising the steps of:
    providing a component having a first surface;
    measuring one or more surface distances between an optical measurement device and at least one surface target point on the first surface;
    applying a coating on at least a portion of the first surface of the component, wherein the portion includes the at least one surface target point;
    measuring one or more coating distances between the optical measurement device and at least one coating target point, the at least one coating target point being substantially superimposed over the at least one surface target point, wherein the one or more coating distances are less than the one or more surface distances, whereby the optical measurement device is located on the same side of the first surface during both the step of measuring one or more surface distances and the step of measuring one or more coating distances;
    calculating the difference between the surface distance measurement and the coating distance measurement so as to determine the thickness of the coating at the at least one target point; and
    storing the calculated difference in a data acquisition device.

2. The method of claim 1 further comprising the steps of:
    prior to the step of applying the coating, measuring one or more surface temperatures at the at least one surface target point, wherein each of the surface temperature measurements is taken at substantially the same point as each of the surface distance measurements; and
    substantially concurrently or substantially immediately after the step of applying the coating, measuring one or more coating temperatures at the at least one coating target point, wherein each of the coating temperature measurements is taken at substantially the same point as each of the coating distance measurements.

3. The method of claim 2 further comprising the step of:
    based on the coating thickness calculations, determining the areas where additional coating is required; and
    applying additional coating to areas of the at least a portion of the first surface.

4. The method of claim 2 further comprising the steps of:
    allowing the component and coating to reach to substantially ambient temperature;
    measuring one or more ambient coating distances between the optical measurement device and the at least one coating target point; and
    measuring one or more ambient coating temperatures at the at least one coating target point, wherein each of the ambient coating temperature measurements is taken at substantially the same point as each of the coating distance measurements.

5. The method of claim 4 further including the steps of:
    calculating a thermal expansion correlation value for each target point; and
    calculating the thickness of the coating for each target point takng into account the thermal expansion correlation value.

6. The method of claim 2 wherein each surface temperature measurement is taken substantially simultaneously with each corresponding surface distance measurement.

7. The method of claim 1 wherein each distance measurement is an average of at least two measurements taken at different locations substantially proximate to each target point.

8. The method of claim 1 wherein the step of measuring the coating distance is conducted substantially simultaneously with or immediately after the coating applying step.

9. The method of claim 1 wherein the step of applying the coating includes at least two coating cycles, wherein the step of measuring the surface distance is conducted after each coating cycle.

10. The method of claim 9 further comprising the step of:
    calculating the coating deposition rate for each cycle at each coating target point.

11. The method of claim 1 wherein the at least one surface target point and the at least one coating target point are one of a plurality of discrete points or a substantially continuous path.

12. A system for measuring the thickness of a coating on a component comprising:
    a component having a first surface;
    a coating imparting device attached to a movable control arm;
    an optical measurement device for measuring the distance between the optical measurement device and the first surface along a target profile, the optical measurement device attached to the control arm;
    a data acquisition system; and
    a programmable controller operatively associated with the control arm and at least one of the data acquisition system and optical measurement device, wherein the controller moves the control arm,
    wherein the data acquisition system stores data received from at least one of the optical measurement device and the movable control arm, wherein the data acquisition system is programmed to calculate coating thickness based at least on distance measurements taken along the target profile before and after a coating is applied to the first surface, wherein the distance between the optical measurement device and the post-coated first surface along the target profile is less than the distance between the optical measurement device and the pre-coated first surface along the target profile.

13. The system of claim 12 wherein the optical measurement device is one of a CCD laser displacement sensor or a wide beam CCD laser displacement sensor.

14. The system of claim 12 wherein the optical measurement device is positioned substantially perpendicular to the component surface at each measurement location.

15. The system of claim 12 wherein the coating imparting device is a thermal spray gun.

16. The system of claim 12 further comprising a temperature measurement device for measuring the temperature at each distance measurement taken along the target profile, the temperature measurement device operatively associated with the data acquisition system, wherein the temperature measurement device is attached to the control arm.

17. The system of claim 16 wherein the data acquisition system is further programmed to take into account thermal expansion in calculating coating thickness based at least on the temperature measurements taken along the target profile before and after a coating is applied to the first surface.

18. The system of claim 16 wherein the temperature measurement device is a pyrometer.

19. The system of claim 16 wherein the temperature measurement device and optical measurement device are aligned so that the temperature measurement is made in substantially the same location as the distance measurement.

20. The system of claim 12 wherein the optical measurement device is positioned relative to the coating imparting device such that one or more distance measurements can be taken one of substantially simultaneously with the application of a coating to the first surface of the component or substantially immediately after a coating is applied to the first surface of the component.

21. A method for measuring the thickness of a coating on a component comprising the steps of:

providing a component having a first surface;

measuring one or more surface distances between an optical measurement device and at least one surface target point on the first surface;

applying a coating on at least a portion of the first surface of the component, wherein the portion includes the at least one surface target point;

measuring one or more coating distances between the optical measurement device and at least one coating target point, the at least one coating target point being substantially superimposed over the at least one surface target point, wherein the one or more coating distances are less than the one or more surface distances, whereby the optical measurement device is located on the same side of the first surface during both the step of measuring one or more surface distances and the step of measuring one or more coating distances;

calculating the difference between the surface distance measurement and the coating distance measurement so as to determine the thickness of the coating at the at least one target point; and outputting the calculated difference to a user.

* * * * *